United States Patent
Ackermann et al.

[19]

[11] Patent Number: 6,137,280
[45] Date of Patent: Oct. 24, 2000

[54] UNIVERSAL POWER MANAGER WITH VARIABLE BUCK/BOOST CONVERTER

[75] Inventors: Eric Ackermann, San Diego; William Leslie Hicks, Escondido, both of Calif.

[73] Assignee: Science Applications International Corporation, San Diego, Calif.

[21] Appl. No.: 09/235,774

[22] Filed: Jan. 22, 1999

[51] Int. Cl.[7] ........................................................ H02J 3/12
[52] U.S. Cl. .............................. 323/354; 323/224; 323/284; 324/426
[58] Field of Search ............................... 323/322, 323, 323/324, 222, 282, 284, 354; 324/426, 433; 320/132; 439/502, 503, 504

[56] References Cited

U.S. PATENT DOCUMENTS

| | | | |
|---|---|---|---|
| 4,504,775 | 3/1985 | Becker | 320/32 |
| 4,536,696 | 8/1985 | Ray | 320/21 |
| 4,647,833 | 3/1987 | Schmidt et al. | 320/21 |
| 4,810,948 | 3/1989 | Takuma | 323/280 |
| 5,045,774 | 9/1991 | Bromberg | 323/224 |
| 5,049,804 | 9/1991 | Hutchings | 320/20 |
| 5,071,368 | 12/1991 | Garritano et al. | 439/504 |
| 5,113,127 | 5/1992 | Hoffman et al. | 320/21 |
| 5,122,721 | 6/1992 | Okada et al. | 320/2 |
| 5,250,891 | 10/1993 | Glasgow | 320/31 |
| 5,297,056 | 3/1994 | Lee et al. | 323/354 |
| 5,317,499 | 5/1994 | Brakus | 363/56 |
| 5,355,077 | 10/1994 | Kates | 323/224 |
| 5,367,447 | 11/1994 | Sakuragi et al. | 363/16 |
| 5,484,668 | 1/1996 | Kutz et al. | 291/121 |
| 5,510,694 | 4/1996 | Nilssen | 320/39 |
| 5,526,274 | 6/1996 | Bolan et al. | 364/482 |
| 5,592,064 | 1/1997 | Morita | 320/2 |
| 5,621,299 | 4/1997 | Krall | 320/5 |
| 5,691,623 | 11/1997 | Tsantilis | 320/39 |
| 5,774,734 | 6/1998 | Kikinis et al. | 323/282 |
| 5,783,930 | 7/1998 | Albert et al. | 320/140 |
| 5,844,550 | 12/1998 | Trainor et al. | 323/322 |

*Primary Examiner*—Peter S. Wong
*Assistant Examiner*—Gary L. Laxton
*Attorney, Agent, or Firm*—Fitch, Even, Tabin & Flannery

[57] ABSTRACT

A universal power manger capable of power converting a universal range of unregulated power inputs into a high-resolution programmable regulated (constant) output voltage or a high-resolution programmable (constant) current and of charging and/or diagnosing standard battery chemistries with a universal range of unregulated AC and DC power inputs. It includes an extremely high resolution monolithic potentiometer of at least 512 positions. Preferably, two or more extremely high resolution monolithic potentiometers are used to create a high resolution resistance chain, each having at least 512 positions and at least one tap point set according to a user selected output voltage and/or current. Each potentiometer has a resultant tap point selected by an analog switch in accordance with a user selected output that determines overall resistance in the resistance chain, the output voltage being proportional to the overall resistance. A microprocessor with embedded control software controls the tap points and selection thereof in accordance with user selections. A current sense circuit and feedback loop is included for generating a current output in response to the current through the current sense circuit.

24 Claims, 9 Drawing Sheets

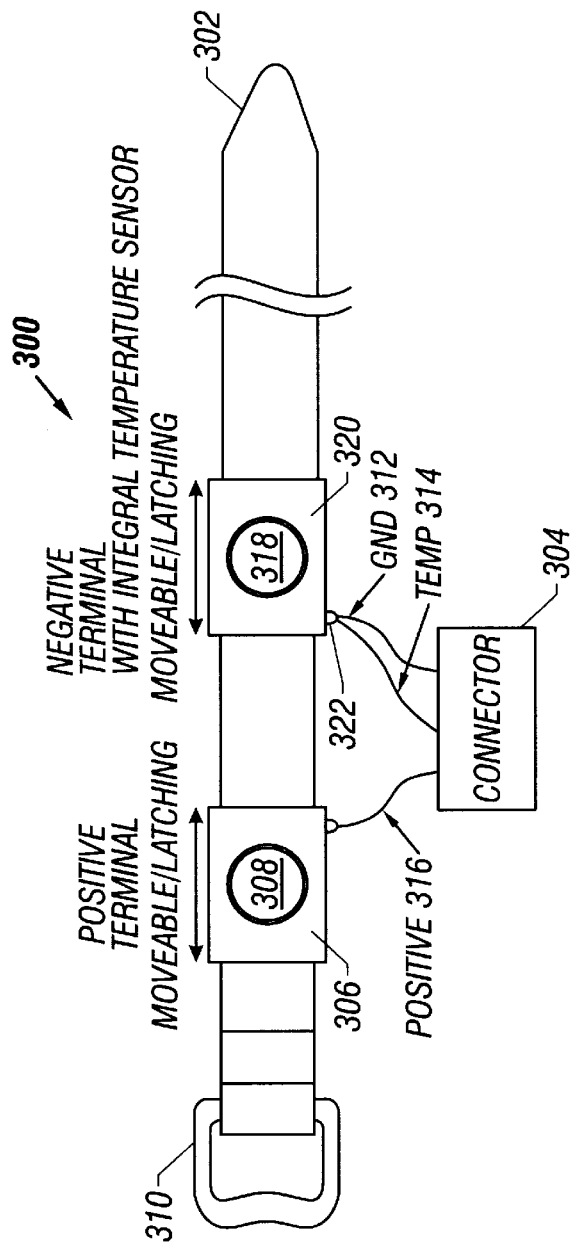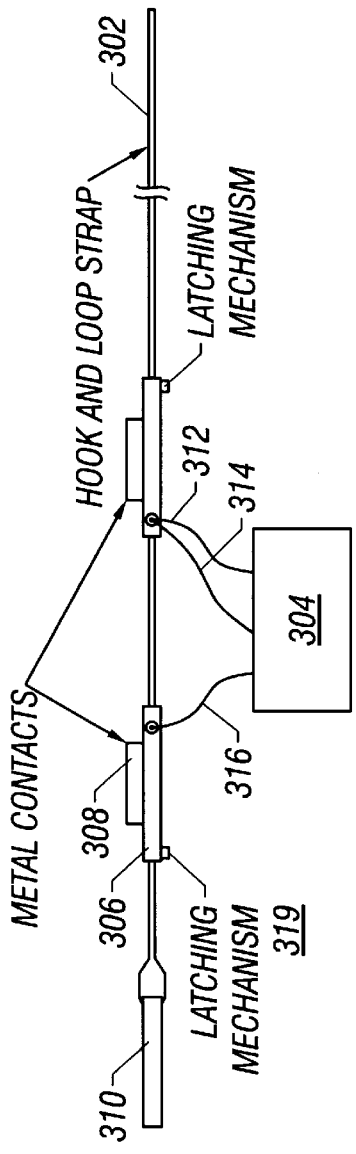

KEY TO FIGURE 7

| FIG. 7A |
| FIG. 7B |

6,137,280

UNIVERSAL POWER MANAGER WITH VARIABLE BUCK/BOOST CONVERTER

BACKGROUND OF THE INVENTION

The present invention relates to multi-featured power management apparatus and related methods, and more particularly, to multi-featured programmable power converters battery chargers and power management apparatus. Even more particularly, the present invention relates to a universal power management system, using a variable buck/boost converter which can be programmed to provide constant output voltage within a near-universal selection range or a constant current output within a universal selection range, accepting near-universal DC and AC input.

A few examples of the thousands of devices that operate from either rechargeable (secondary) or non-rechargeable (primary) batteries include: cellular phones, cordless drills, hand-held radios, notebook computers, video cameras, military radios, and other application specific instruments. Typically, devices requiring rechargeable batteries are sold with accessory battery chargers that are useful only for a specific device type. Often the accessory battery charger is only useful for a specific device, from a specific manufacturer.

Typical functions desired from any power management device include, but are not limited to, the ability to accept variable input power; accepting standard AC or DC voltage input; sensing battery temperature during a charge cycle; and providing a selectable near universal and constant output voltage which is compatible with a selected target device; providing a selectable, near universal constant output current while charging a battery; and providing a secure connection between the power management device and the selected target battery or device to be charged or powered. Other desirable functions of power management devices include, battery diagnostics, battery reconditioning, multiple backup charge cut-off methods, programmable output voltages or currents, and an ability to display information pertaining to charging and conversion processes.

Most commonly available DC voltages range from about 3 VDC to 30 VDC and most commonly available AC voltages are near 115 VAC or 230 VAC. There is no known power manager, power converter or battery charger that accepts all of these ranges of input voltages while simultaneously providing a wide range of programmable constant output voltages e.g., 2 VDC to 30 VDC or constant output currents, e.g., 0.01 ADC to 2 ADC, efficiently, with compact solid-state hardware. There is a need in the industry for a self-contained, multi-featured, robust, universal power manager that has high selectivity resolution for providing a high resolution selectable current output (on the order of 0.01 ADC resolution) for providing a constant high resolution voltage output (on the order of 0.01 VDC resolution) and while accepting a wide range of input voltages with compact solid-state electronics in an easily programmed fashion for performing the multiple desired operations listed above.

Prior approaches in the art to the above problems have been severely limited. Some approaches which have either constant current output or an output following a characteristic current curve, are not generally selectable or programmable and must be redesigned for different inputs and outputs.

Other approaches do not provide the necessary resolution to accept universal input voltage and provide universal output voltage, or do not provide constant current in battery charging operations and are also not programmable.

For example, multi-pole switches do not operate efficiently with more than eight or ten resistors. Thus, prior art devices employing switches to switch resistors into a resistive voltage divider in order to select an output voltage are severely limited in resolution. Similarly, most microprocessors with built in A-to-D and D-to-A converters have resolutions of only eight bits (256 discrete values). This low resolution is inadequate for providing a constant current supply for battery recharging in the same device as provides high resolution constant output voltages over a wide range.

Consequently, there is also a need in the field of power management (e.g., of battery charging and power conversion) for a universal power management device that allows a user to program a wide range of regulated (constant) output currents and voltages with high resolution, to be supplied in response to a wide-ranging variable (unregulated) input voltage, and for enabling a plurality of operations by the universal power manager.

Similarly, since batteries and devices typically have custom adapters or battery chargers or alternative power sources, and since no known adapter allows near universal electrical connection to a wide variety of battery packs and device terminals, there is also a need for a power manager providing a terminal adapter and cable set allowing easy and reliable connection to a vast majority of batteries and battery powered devices.

Presently, most battery chargers and power converters do not come equipped with a sealed and hardened enclosure, thus making them susceptible to damage from rust and moisture when left outdoors and making them vulnerable to mechanical damage due to rough treatment. Thus, there is a further need in the field for such a device, which is able to withstand harsh environmental conditions, such as those in the field, as well as addressing the other above needs.

The present invention advantageously addresses the above and other needs.

SUMMARY OF THE INVENTION

The present invention advantageously addresses the needs above as well as other needs by providing a full-featured universal power converter and battery management instrument capable of charging and/or diagnosing standard battery chemistries with a universal range of unregulated AC and DC power inputs, and capable of power converting a universal range of unregulated power inputs into a high-resolution programmable regulated (constant) output voltage, or a high-resolution programmable (constant) current.

In one of its most basic forms, an embodiment of the present invention uses extremely high resolution monolithic digital potentiometers to provide a sufficient range of variable resistance to allow a user to select, with a high degree of resolution a wide range of regulated (constant) output currents, and output voltages in power conversion or battery charging, with a wide range of unregulated (variable) input voltages. The resolution in the digital potentiometers is selected to be proportional to the desired resolution in the output ranges desired.

In one variation a power management system comprises: a first monolithic potentiometer, having at least 512 positions, the first monolithic potentiometer comprising at least one tap point, the at least one tap point including a tap control input, the at least one tap point being responsive to the tap control input; a second monolithic potentiometer coupled in series with the first monolithic potentiometer, and having at least 512 positions, the second monolithic potentiometer comprising at least another tap point, the at least another tap point including another tap control input, the at least another tap point being responsive to the other tap control input; means for switchably selecting a resultant tap point selected from the at least one tap point and the at least another tap point, and for applying a control signal to the tap control input or the other tap control input, respectively in accordance with the selected one of the at least one tap point and the at least another tap point, the resultant tap point and the control signal together determining an overall resistance of the first and second monolithic potentiometers; a voltage regulator coupled to the first and second monolithic potentiometers; and an output voltage of the voltage regulator being proportional to the overall resistance of the first and second monolithic potentiometers.

In a further variation each of the first and second monolithic potentiometers comprise one or more lower-resolution monolithic potentiometers, each lower-resolution monolithic potentiometer being coupled in series with each other lower resolution monolithic potentiometer, wherein each lower-resolution monolithic potentiometer includes an interior tap point selectively coupleable to one of the first and second tap points.

Yet another variation comprises a microprocessor coupled to the tap control input and the other tap control input and to the means for switchably selecting, for sending a tap control signal to one of the tap control input and the other tap control input and for sending a select signal to the means for selecting, the tap control input and the select signal varying as a function of a selected output voltage.

Another embodiment of the invention is characterized as programmable universal power manager enabling near-universal multi-operational power management which includes: an AC input means for accepting a near-universal AC input power coupled to an AC input connector engageable with an external AC power source; a DC input means for accepting a near-universal DC input power coupled to a DC input connector engageable with an external DC power source; and a variable buck boost converter coupled to the AC input means, the DC input means and a power output connector, engageable with an external target device accepting power, the variable buck/boost converter including: a processor; a resistance chain; and a voltage regulator coupled to the resistance chain for generating a selected near-universal output voltage proportional to an overall resistance of the resistance chain, from the accepted near-universal input power; and a current sense circuit, coupled to the voltage regulator and to the microprocessor for sensing a current and sending a current indicator signal to the microprocessor, the microprocessor including means for maintaining a constant output current, in response to the current indicator signal, by tuning the resistance chain in response to the current indicator signal.

Another variation of the above embodiment includes: a battery test computer program unit in the processor to direct automated battery testing of a particular type of battery selected by a user, according to battery testing data in the processor and the battery selection; and a recharging computer program unit in the processor for directing automated recharging with charge-cutoff according to recharge data in the processor and the battery selection.

BRIEF DESCRIPTION OF THE DRAWINGS

The above and other aspects, features and advantages of the present invention will be more apparent from the following more particular description thereof, presented in conjunction with the following drawings wherein:

FIG. 5A is a top view of a universal terminal adapter useful with the universal power manager of FIG. 1 to make electrical connections for charging rechargeable batteries.

FIG. 5B is a side view of a universal terminal adaptor of FIG. 5A;

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
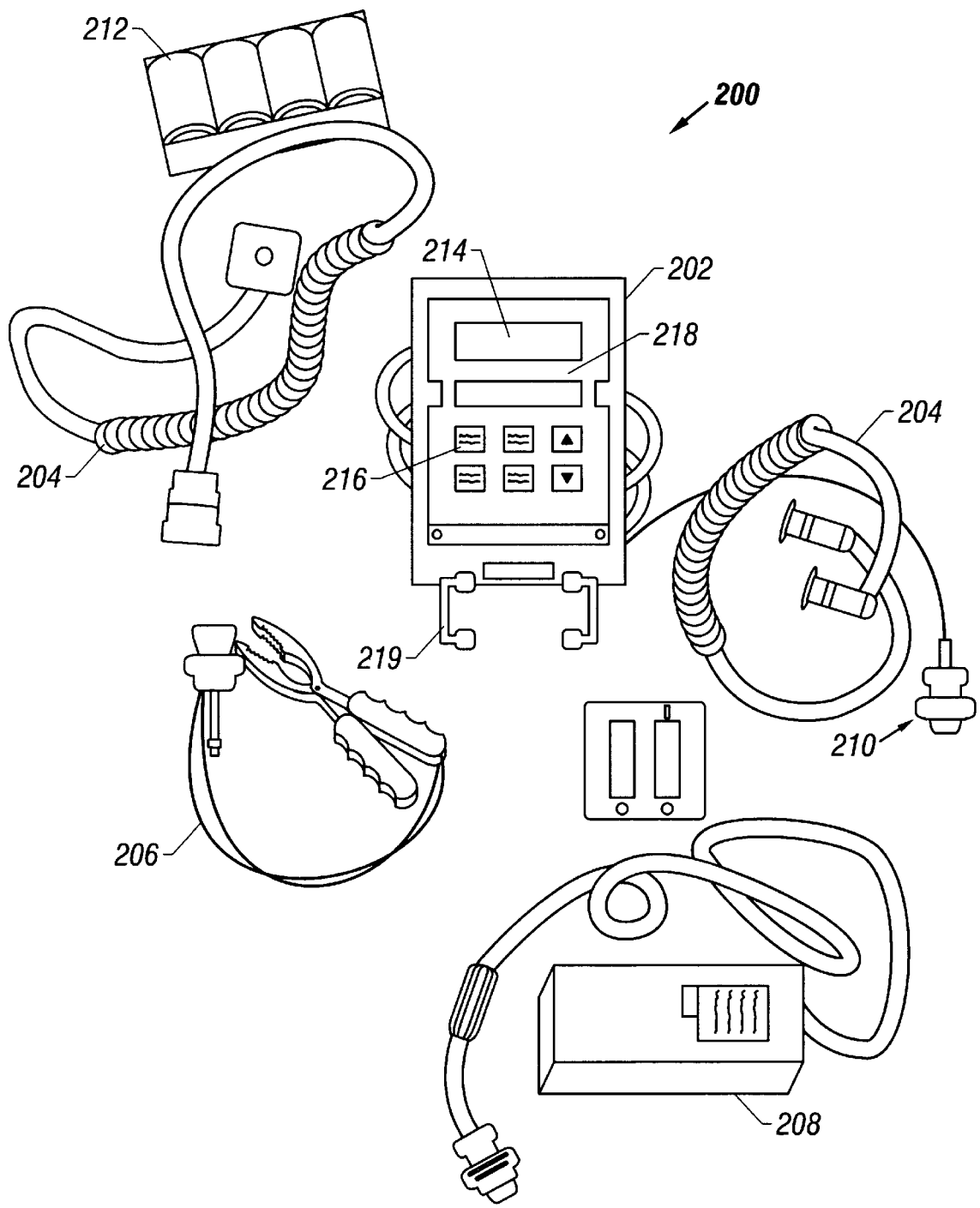
FIG. 1 is a diagram of a universal power manager, including a control unit, a battery set, a power I/O cable, a battery clip adapter, a power adapter, and a microchip adapter.

In FIG. 1 a diagram of one variation of a universal power manager 200, which includes a control unit 218, a power I/O cable 204, a battery clip adapter 206, a power adapter 208, a microclip adapter 210, and a battery set 212. The control unit 218 has keypad 216 including keys for such commands as "enter", "escape", "power", "light" and for moving "up" and "down" a menu. The control unit 218 has a sealed chassis 202 making it weather resistant, to dust and moisture so it can be robust in field operations.

Figure 2:
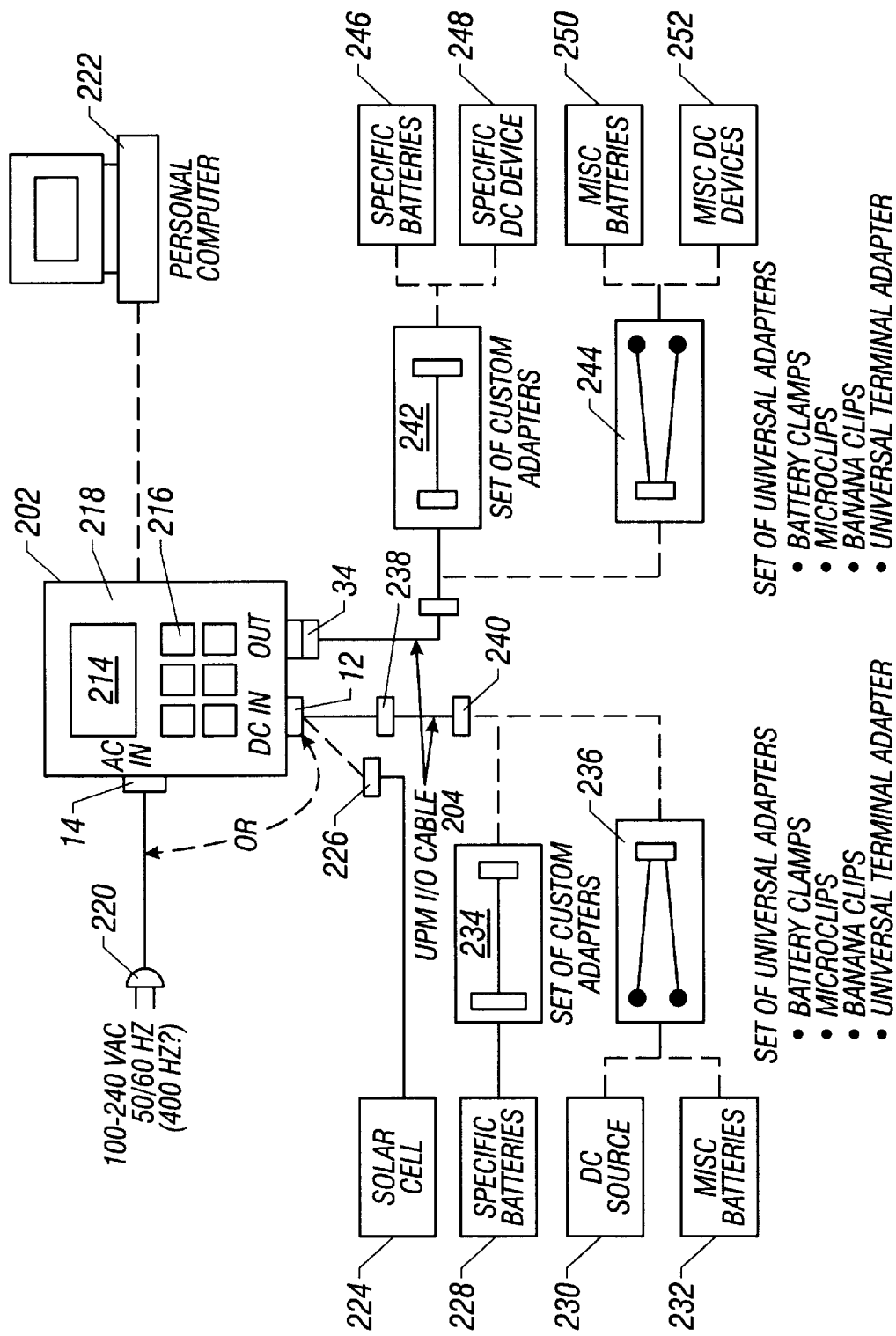
FIG. 2 is a diagram of connecting configurations for the universal power manager.

Referring to FIG. 2, FIG. 2 shows some configurations for connecting the universal power manager 200 with it's control unit 218, and the assembly of cables and adapters of FIG. 1. FIG. 2 shows a plurality of setups and includes: the control unit 218; AC input 14; DC input 12; DC output 34; a sealed chassis 202; a personal computer 222; an AC power cord 220; a UPM I/O cable 204 with distal connector 238 and near connector 240; a solar cell 224; an input specific battery 228; an input set of custom adaptors 238; an input miscellaneous battery 232; a DC power source 230; an input set of universal adapters 236; a set of custom adapters 242; a set of universal adapters 244; a specific battery 246; a specific DC device 248; and miscellaneous batteries 254; and miscellaneous DC devices 252. The setups are fully explained later herein.

Figure 3:
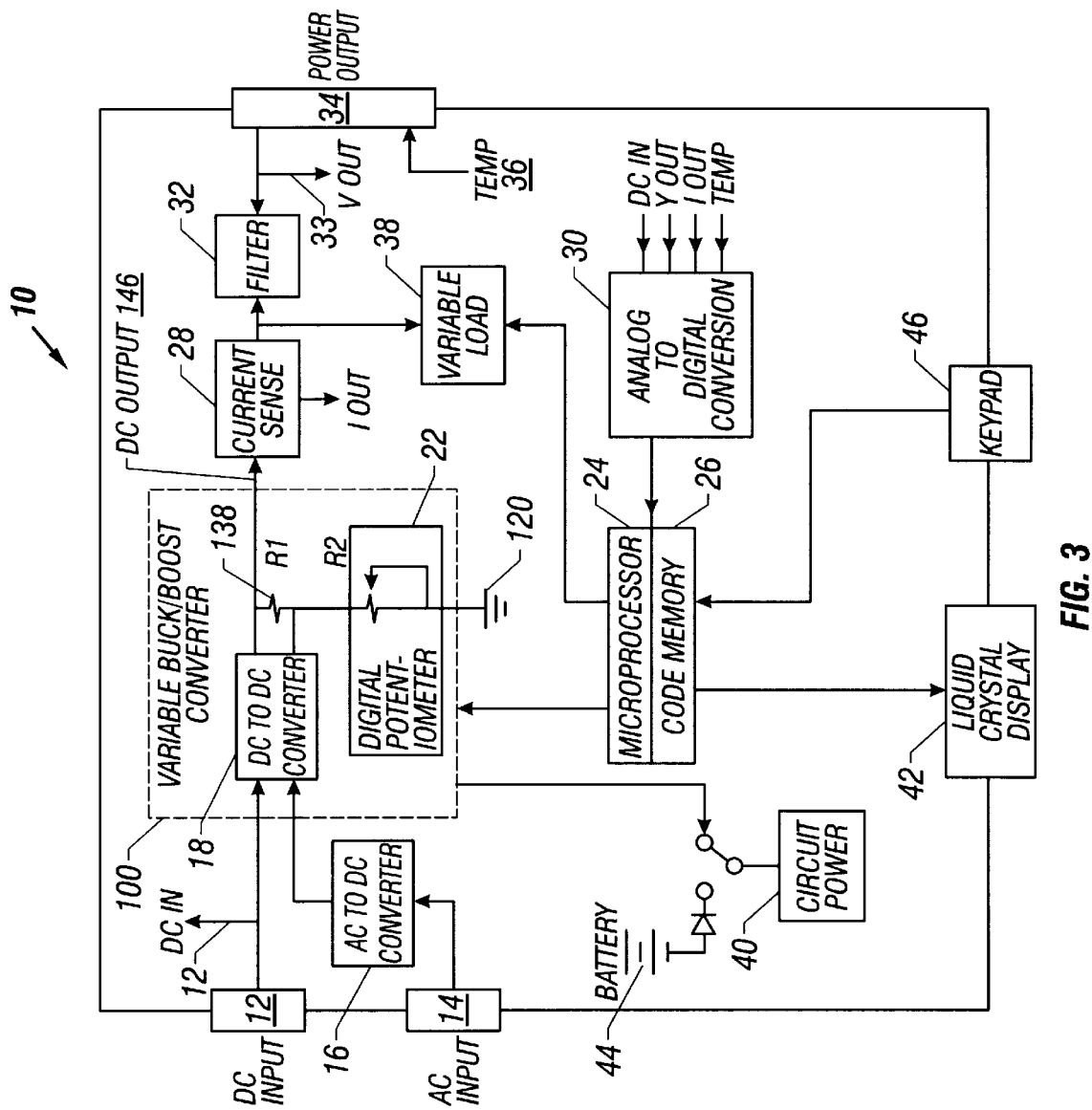
FIG. 3 is a functional block diagram of the universal power manager of FIG. 1, including a variable buck/boost converter circuit.

Referring to FIG. 3, a functional block diagram of the electronics of the control unit 218 of the universal power manager 200 with a variable buck/boost converter 100 is shown in accordance with one embodiment of the present invention.

Variable Buck/Boost Circuitry

As shown in FIG. 3, the power conversion function of the universal power manager is provided by the variable buck/boost converter 100, which is comprised of a DC-to-DC converter circuit 18, a fixed resistor R1 138 and a digital potentiometer circuit 22. A power input to the variable buck/boost converter 100 is selectively connected to either a DC input 12 or an AC input 14 by means of an AC to DC converter 16.

Figure 4:
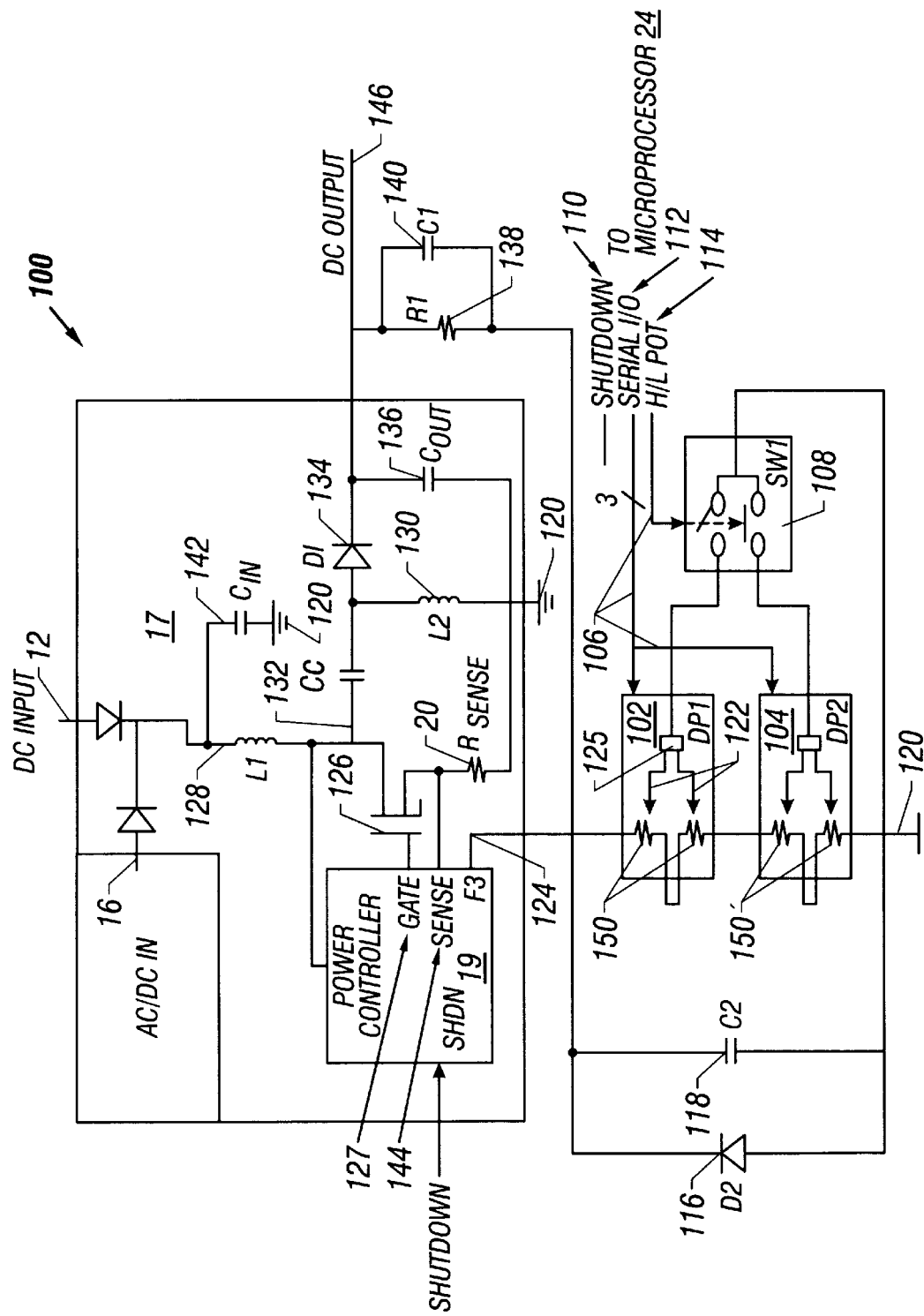
FIG. 4 is a simplified circuit diagram of the variable buck/boost converter circuit of FIG. 1 employing two monolithic digital potentiometers and a solid sate analog switch.

The resultant DC input 17, shown in more detail in FIG. 4, is applied to energy storage elements $L_1$ 128, and $C_{in}$ 142. A Field Effect Transistor (FET) 126 is included with its drain connected to inductor $L_1$ 128, its gate connected to a gate drive of a power controller 19 and whose source is connected to a sense resistor 20 and the power controller sense input 144. The opposite terminal of the sense resistor 20 is connected to a circuit ground 120.

Referring to FIG. 4, a DC output 146 is sensed at a feedback input node 124 of a power controller 19 through a voltage divider formed by fixed resistor $R_1$ 138 and a variable resistance network formed by digital potentiometers 102 and 104 in conjunction with analog switch 108. When a voltage at the feed back input node 124 drops below a threshold voltage internal to power controller 19, a gate output 127 (or gate drive) is driven in order to turn on the FET (switch) 126. A current path from the DC input 17 and storage capacitor $C_{in}$ 142, through inductor $L_1$ 128 and a drain to source junction of the FET (switch) 126 and through the sense resistor 20 is thus formed allowing storage element inductor $L_1$ 128 to become energized.

When the current through inductor $L_1$ 128, FET (switch) 126 and sense resistor 20, as sensed by the power controller 19 via its sense input 144 reaches a level determined by the resistance value of sense resistor 20, the gate drive 127 is removed in order to turn off the FET (switch) 126. This results in a transfer of energy between the storage elements $L_1$ 128, and $C_{in}$ 142 to the output capacitor 136 as well as the DC output 146, AC coupled through coupling capacitor $C_c$ 132.

The power controller 19 is designed such that this energy transfer will be effected by cycling the FET (switch) 126 on and off at such a frequency, up to a maximum rate, as is required to maintain a constant voltage as determined by a ratio of the resistance of fixed resistor $R_1$ 138 and the resistance formed by digital potentiometers 102 and 104 in conjunction with analog switch 108.

A voltage divider is formed at the DC output 146 with a series of resistors to circuit ground 120. The first of these resistors $R_1$ 138 is in parallel with a feed forward capacitor $C_1$ 140. The remaining resistors comprise two monolithic digital potentiometers 102, 104 in series, with their wipers being selectively connected to ground 120 or floated, as described hereinbelow. A filter capacitor $C_2$ 118 and a zener diode $D_2$ 116, are in parallel with the series combination of the monolithic digital potentiometers 102, 104. Capacitors $C_1$ 140 and $C_2$ 118 are selected so as to compensate for the stray circuit capacitances introduced with the use of three integrated circuits, i.e., potentiometers, 102, 104 and switch 108; in place of a single fixed resistor. A feedback input of the power controller 19 is coupled at a node between the resistor $R_1$ 138 and the monolithic digital potentiometers 102, 104, thus providing a voltage feedback to the power controller 19.

Referring back to FIG. 3, a single ended primary inductance converter (SEPIC) topology DC/DC converter 18 in which the DC output is set with the selection of two effective feedback resistors, i.e., the resistor $R_1$ 138 and the monolithic digital potentiometers 102, 104 is thus formed providing extremely high resolution control over the voltage supplied at the DC output.

The monolithic digital potentiometers are incorporated into a digital potentiometer circuit that is digitally controlled through a microprocessor 24. When a programmable output voltage is set, the microprocessor 24 varies the resistance of the monolithic digital potentiometer circuit. This affects the output voltage provided by the DC-to-DC converter 18, as the voltage is proportional to the overall resistance in the monolithic digital potentiometers 24 and the resistance $R_1$ 138.

The DC-to-DC converter 18 receives input power from either the DC input 12 or the AC input 14 through the AC-to-DC converter 16. The DC output 146 of the variable buck/boost converter 100 is fed through a current sense circuit 28. An output of the current sense circuit module 28 passes through a filter circuit 32, to remove noise, to a power output 34 of the universal power adaptor 10. The current sense circuit device 28 provides a current indicator signal (as a voltage output), I-out, proportional to the current flowing through the current sense circuit 28.

An analog-to-digital conversion module 30 receives the filtered DC output at the power output 34, the current indicator signal, I-out, the DC input and a temperature sensor input. A sampled power output, a sampled current indicator signal, a sampled power input, and a temperature sensor input, generated respectively in response to the power output 34, the current indicator signal, I-out, the DC input and the temperature sensor input by the analog to digital conversion module 30, are sent to the microprocessor 24.

A feedback loop is formed by the current sense circuit 28, the A-to-D converter 30, and the microprocessor 24, and is used to tune the digital potentiometer circuit 22 to compensate for varying output loads while a constant output current is maintained. In practice, the indicator signal, I-out, from the current sense circuit 28 is continuously sampled at the A-to-D converter 30, in response to which the microprocessor 24 continually adjusts the tap points 122 on the monolithic digital potentiometers 102 (FIG. 4) and 104 (FIG. 4), and the analog switch 108 (FIG. 4), to maintain the constant output current.

Another application of the feedback loop circuit described above is to provide a constant voltage output. Fine-tuning of the monolithic digital potentiometers 102 and 104 is achieved by sensing voltage drops through the current sense circuit 28 and filter 32, by sampling the power output 34, V-out, and making similar adjustments of a less dramatic nature of the tap points 122 (FIG. 4) on the monolithic digital potentiometers 102, 104 and the analog switch 108 with the microprocessor 24 in order to maintain a constant voltage at the power output 34.

Control of the microprocessor 24, in accordance with the constant current output feature is accomplished with embedded software routines 26 that modify the microprocessor 24 with feedback control algorithms. This feature is critical to many battery charging applications, but, because of the high resolution voltage control provided by the present embodiment, requires very little additional hardware over that required for constant voltage functionality.

As shown in FIG. 3, a fixed resistor $R_1$ 138 is in series with the digital potentiometer 22 which is a resistance chain. In the digital potentiometer circuit of FIG. 4, each separate monolithic digital potentiometer IC, shown as DP1 102 and DP2 104, is coupled to an analog switch 108.

In FIG. 4, each of DP1 102 and DP2 104 has two associated resistance strings 150 and an associated switch 125 to select an associated tap point on one of the two resistance chains 150. Three serial inputs 112, and one H/L (High/Low) potentiometer 114 input are used to select one of 1024 tap point positions (two points for each of two potentiometers, with each tap point having 256 possible positions) on a resistance chain. One tap point 122, and its respective position, is selected by the three serial inputs 112 for each of two resistors 150 of DP1 102 and each of two resistors 150' of DP2 104, and one of DP1 102 or DP2 104 is selected by the H/L potentiometer input 114. Routing the selected tap point of the selected one of DP1 102 and DP2 104 through an analog switch 108 (controlled by the H/L potentiometer signal) to ground 120 realizes a single wiper function.

In FIG. 4, each of DP1 102 and DP2 104 consists of two 256 position potentiometers on a single IC substrate. These commercially available IC's allow each of the 256-position potentiometers to be wired in series and include a wiper selection circuit to effectively produce a device with 512 positions. Since the universal power manager application of the present embodiment requires more than 512 positions to adequately provide constant current control, two IC's are wired in series to create a 1024-position potentiometer. Each separate 256 position potentiometer has a separate wiper function or tap point but only one of the four tap points is grounded, so as to yield a single wiper device. The analog switch 108 along with the four digital potentiometer tap points 122 and 2 resultant tap points (one selected from each IC) are all properly controlled by embedded computer programs 26 that modify the microprocessor in order to provide for the single effective tap point (or wiper).

Referring back to FIG. 3, to facilitate microprocessor 24 control and to establish a simple interface, the keypad 46 is connected to the microprocessor 24 as well as a liquid crystal display 42. Alternatively, the microprocessor may be controlled by an externally connected control unit (not shown). The microprocessor 24, with embedded code and memory 26, implements internal control algorithms directed at hardware circuits and enables a user interface.

The microprocessor 24 receives input from the analog-to-digital converter 30 and the keypad 46 and provides input to the variable buck/boost converter circuit 100, the LCD 42, and a variable load module 28 in different modes of operation.

The variable load module 38, under microprocessor 24 control, is used during battery diagnostics or for discharging or reconditioning a battery. During automated diagnostics, a preset load is programmed into the variable load by the microprocessor 24 based upon the battery type selected by the user. Of course battery output voltages are monitored and used to calculate battery capacity. The variable load module 38 receives current from a filter 32 in connection 34 with the power output connector 34 and source.

Operational Modes

In one application, DC input voltage from an external source, in a range of at least 3 VDC to 30 VDC, is accepted at the DC input 12. DC input voltage may optimally pass through a reverse polarity protection circuit (not shown) before being converted in the variable buck/boost converter shown in FIG. 3.

In another application, AC power is connected to an external converter or universal AC-to-DC power adapter 208 (i.e., transformer/rectifier), or an internal converter 16, to convert AC power to DC power.

An AC range of 100–240 VAC at 50–60 Hz and a DC range of 3–30 VDC is preferably automatically detected and accepted by the universal power adapter (i.e., external converter) 208, the internal converter 16 or the DC Input 12 (for VDC). Accordingly, no user programming is required to implement any of these ranges of AC or DC input currents. Thus, any input voltage within the above ranges is accepted automatically by the universal power manager 10 without programming, setup or adjustment. Any input can be accepted because of a current limiting feature.

The variable buck/boost converter 100 simply turns on the FET (switch) 126 until the current limit is reached as often as it needs to maintain the desired output voltage. Lower input voltages will require the switch to be on longer to reach the current limit.

Automatic AC or DC detection and acceptance is accomplished by performing a diode OR (logical OR) with the output of the AC-to-DC converter 16 and the DC input 12 as shown in FIG. 4. The input source with the highest voltage powers the variable buck/boost converter 100 and the other input source is blocked due to its reverse biased diode. This also works in the case of using an external converter such as the universal power adapter 208, since it is just another DC source applied at DC Input 12.

In practice, for example, a user connects an external AC power source to the universal power adapter 208 shown in FIG. 1 with a standard power cord. The universal power adapter 208 is then connected to the control unit 218 at the DC input 12. Alternately, an external AC power source is connected by AC cord 220 shown in FIG. 2 directly at AC input 14. The AC cord 220 is a standard power cord.

Referring again to FIG. 2, the four power input sources on the left side of the figure are examples of DC power sources which are accepted by the UPM 10 and converted to appropriate DC outputs. The four output sources on the right (246, 248, 250 and 252) are batteries to be charged or DC devices to be powered.

A UPM I/O cable 204 has two female connectors 238, 240, either of which can mate to the DC input 12 or power output 34 male connectors on the UPM 10. Identical cables are used for input and output. The solar cell 224 contains a captive cable that has a female connector 226 for direct mating to the UPM DC input 12 (connector). The specific batteries 228 are a set of batteries for which custom adapters 234 have been designed. The custom adapters 234 consist of a female connector on one end, which mates to the UPM I/O cable 204, and a battery specific connector on another end (a cigarette lighter adapter for example). The DC source 230 and miscellaneous batteries 232 are other possible power sources that have not been specifically designed but would be useful when standard power sources are not available. They are interfaced with the set of universal adapters 236 that consist of a female connector on one end and various, versatile "grabbers" on another end.

The set of custom adapters 242 for power output are custom adapters that have been designed to interface to specific batteries 246 or specific DC devices 248 that are encountered regularly. Some are identical to those identified as the input set of custom adapters 234. This is the case if a battery intended to be charged by the UPM 10 was also used as a power source to run a DC device or charge a smaller capacity battery.

The universal adapters on the set of universal adapters 244 are used to interface to non-standard batteries for input or DC devices for powering and are identical to the input set of universal adapters 236.

A personal computer (PC) 222 through a computer link allows customization of UPM menus displayed on display 214. Since there are so many types of rechargeable batteries it is not feasible to include them all in standard menus of the UPM 10. Different users require access to automated routines for different sets of batteries. A database residing on the PC 222 or at a web site containing data for many battery types can easily support the UPM 10. In one embodiment, a user chooses a number of battery types to download to the UPM 10 through the PC 222.

Charging algorithms for a given chemistry are the same for all batteries of that chemistry and only a few parameters are required to be changed for each unique battery type. Therefore, the UPM 10 would permanently store a set of algorithms in it's memory 26 and retrieve only a small set of parameters associated with each menu selection. When new battery types are downloaded from the PC 222 or a web site, only this parameter set needs be transferred. The parameters include: battery name (a certain number of characters displayed on the menu), battery chemistry, number of cells and capacity (in e.g., ampere-hours). From these parameters all other data, such as negative delta V voltage, current requirement, maximum temperature, maximum elapsed time and characteristic voltage range is derived.

Referring still to FIG. 2, in connecting batteries to the control unit 218, a variety of modes are possible with the universal power manager terminals 219. Commercially available clamps, microclips, grabbers, banana clips and cigarette adapters, as shown in FIG. 2 by the set of input universal adapters 236, and by the set of universal adapters 244 are used for miscellaneous input batteries 232 or miscellaneous batteries 250, input miscellaneous DC sources 230 or miscellaneous DC devices 252 are used for situations where battery or device terminals protrude and are accessible.

The set of input universal adapters 236 such as the adapters described above, are used on the input side of the configurations shown in FIG. 2 and interfaces the above power input sources to the UPM I/O cable 204 which connects to the DC input 12 of the control unit 218. The set of universal adapters 244 are used on the receiving side of the configurations shown in FIG. 2, such as described above, and interface the above receiving sources to the UPM I/O cable 204 which connects to the DC output 34 of the control unit 218 to administer power to the above receiving sources.

For maximum efficiency the input set of custom battery adapters 234 and the set of custom adapters 242 interface (on the power input side of configurations shown in FIG. 2) between the input specific batteries 228 and the UPM I/O cable 204 which connects to the DC input 12 of the control unit 18. They also interface (on the receiving side of configurations shown in FIG. 2) between the specific batteries 246 or specific DC device 248 being charged/powered and the UPM cable 204 which connects to the DC output 34 of the control unit 218. The input set of custom battery adapters 234 (for charging a depleted source or battery) and the set of custom adapters 242 (for receiving power to/from a depleted or test source) is most desirable when one of the specific batteries 228 is used regularly with the universal power manager 10.

Furthermore, the set of custom adapters 234 are interchangeable with the set of custom adapters 242. Similarly, the input set of universal adapters 236 are interchangeable with the set of universal adapters 244.

Also shown in FIG. 2 is the solar cell 224 with the solar cell connector 226 coupled to the DC input 12.

In situations where terminals are flush against the body of the device or are inset, a universal terminal adapter 300 shown in FIGS. 5A and 5B are used.

Referring to FIG. 5A, a top or planar view of the universal terminal adapter is shown. Next, in FIG. 5B a side view of the universal terminal adapter 300 is shown. The universal terminal adapter 300 is used for electrical connection of the control unit 218 to a wide variety of batteries and device terminals with terminals flush against the body of the device or inset in the device.

Using the configuration of FIGS. 5A and 5B, a positive terminal of a battery is connected at protruding metal contact 308 on sliding tab 306 connected to a connector 304 through a first wire 316. A negative terminal of a battery is connected at another protruding metal contact 318 on another sliding tab 320 connected to the connector 304 through a second wire 312. A temperature wire 314 is coupled between a temperature sensor and the connector 304, and provides the temperature sensor signal referenced above the other sliding tab 320.

The universal terminal adapter 300 consists of a long nylon hook and loop strap 302 that can be wrapped around the battery or device and folded back onto itself through the buckle 310. The sliding tabs 306, 320 are attached to the strap 302 and each of positive terminal tab 306, and negative terminal tab 320 contains the protruding metal contact 308, and the other protruding metal contact 318, respectively, that is electrically connected to the wire 316 for positive connection, the other wire 312 for negative connection, and to the temperature wire 314 for temperature, respectively. The negative terminal tab 320 also contains an integral temperature sensor 322, i.e., a thermocouple, a thermistor or other temperature sensitive device, which is connected to wire 314. All three wires 312, 314 and 316 come together at the connector 304 which mates to the UPM I/O cable 204 whose distal end 238 mates to the control unit 218.

Each tab 306, 320 may be locked into position with a tab latch 319. Each tab is, in practice, positioned and locked into place when lined up with the terminals of the device of battery to be powered or charged. And, the strap 302 is wrapped around the device and secured.

In accordance with the present embodiment, as shown in FIGS. 1 and 5A, the control unit 218 includes a sealed enclosure 202 to make it retardant against damage from dust and moisture when left outdoors. For DC input power applications, DC voltage is connected to the control unit 218 at DC input 12 through an I/O cable 204 connected at one end to a terminator of either a microclip adapter 210, a battery clip adapter 206, a universal terminal adapter 300, or other connections, and at another end to the control unit 218. An identical I/O cable 204 can be connected to another device and can be used for output when the universal power manager 10 is used with DC power (and in applications when the universal power manager is used with AC power).

If input power is being provided from an external AC power source or DC power source 224, 228, 230, 232, the external power is provided to a circuit power regulator 40 which generates 5V to provide power to the internal circuitry. Alternatively, internal power may be provided by an internal battery 44 connected to the circuit power regulator 40. If no external power source is present, power is automatically taken from the internal battery 44 to activate most of the internal circuitry. In this operational mode, no output power can be generated, though battery diagnostics, discharge and reconditioning and voltage and temperature measurements can be performed.

If the internal batteries are missing or depleted the variable buck/boost converter 100 can still be powered if an external power source is present at either DC input 12 or AC input 14. The internal battery 44 is diode OR'd with a resultant external power input 17 shown in FIG. 4 to provide power to the circuit power regulator 40. The resultant external power input 17 resulting from diode OR'ing the DC input 12 and the AC-to-DC converter input 16 always powers the UPM buck/boost converter 100 whether internal battery 44 is present or not.

Programming

Figure 6A:
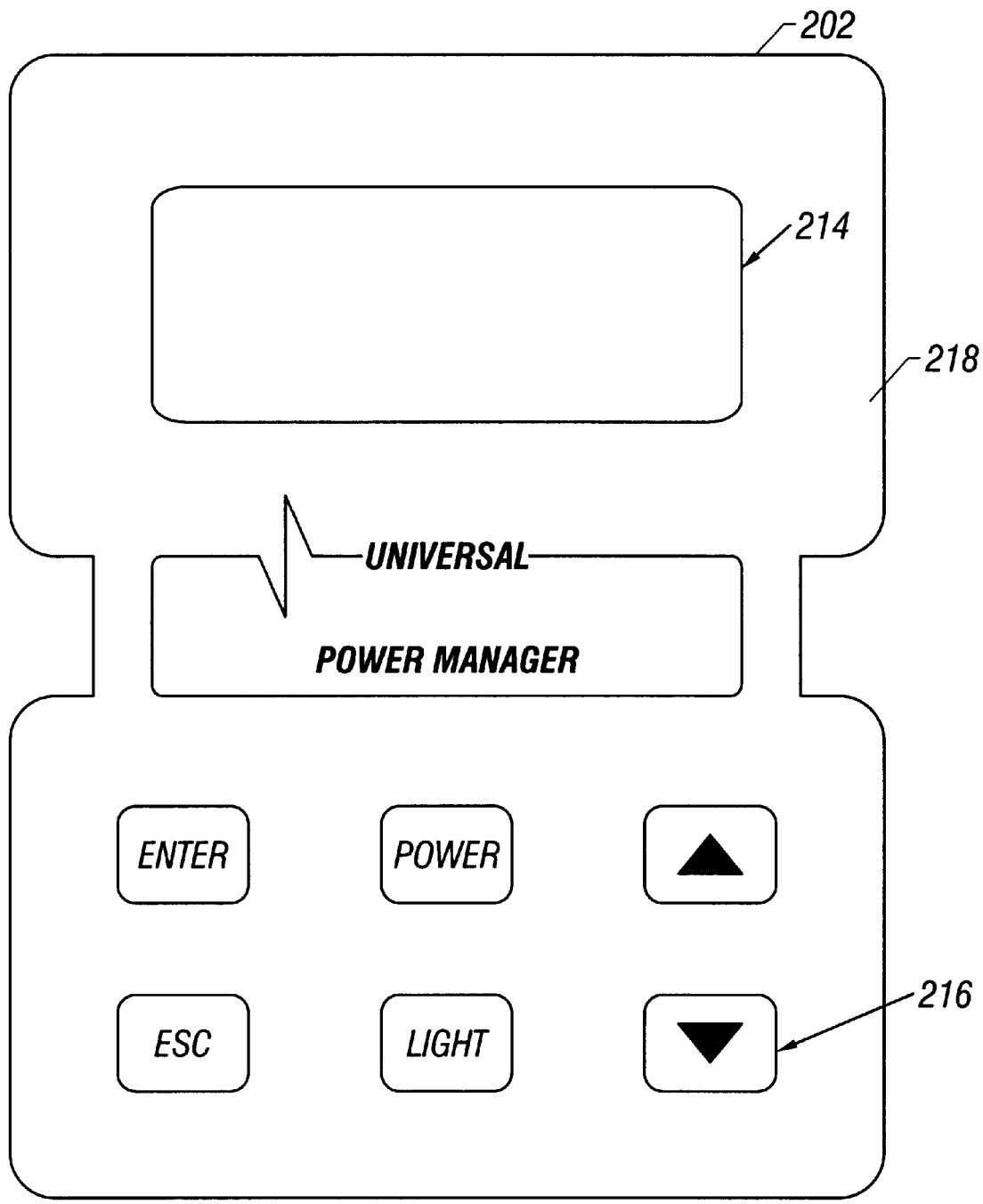
FIG. 6A is a top front view of the control unit of FIG. 1 with an LCD and keypads.

FIG. 6A shows a top view of the LCD display 214 and keypad 216 on the control unit 218. Keys on the keypad 216 are pressed to operate a menu shown in the display 214.

Figure 6B:
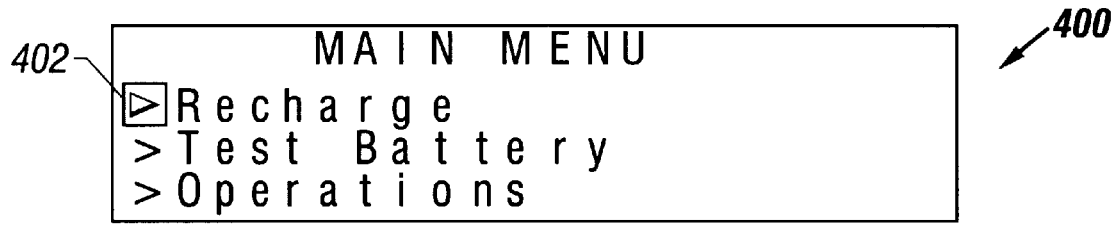
FIG. 6B illustrates an exemplary main menu screen display on the LCD of FIG. 6A.
Figure 6C:
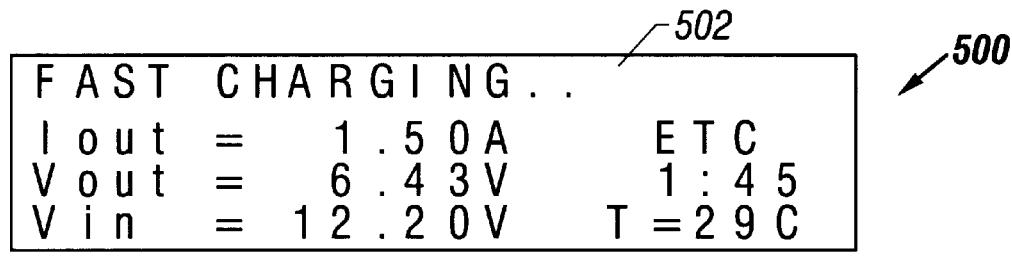
FIG. 6C illustrates an exemplary "Recharge" screen display on the LCD of FIG. 6A for fast charging, in this case a "buck" operation.

FIG. 6B shows an exemplary main menu 400 with three options for "Recharge", "Test Battery" and "Operations". If "Recharge" is selected, a sub menu is presented for selecting a particular battery type. An exemplary screen for fast charging a selected battery type is shown as in FIG. 6C. Dots 502 on top of the screen 500 indicate charging is in progress. "ETC" indicates the estimated time to completion, underneath the heading, in hours:minutes. "T" indicates the temperature in Celsius of a battery being charged.

Figure 6D:
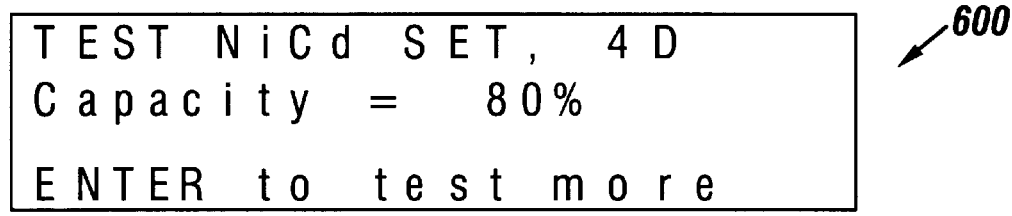
FIG. 6D illustrates an exemplary "Test Battery" screen display on the LCD display of FIG. 6A for testing a NiCd set 4D battery.
Figure 6E:
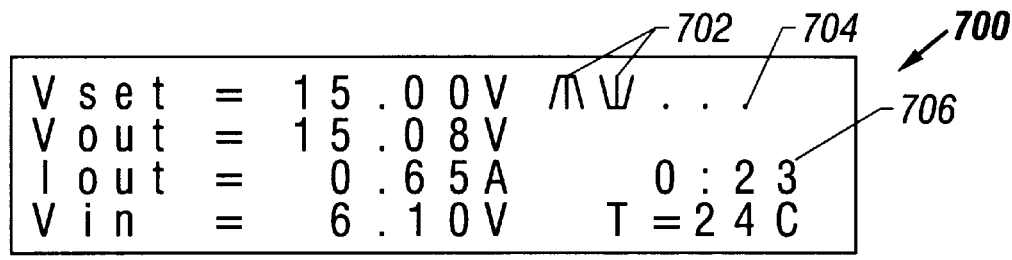
FIG. 6E illustrates an exemplary "Operations" screen display on the LCD of FIG. 6A, in this case a "Boost" operation; this screen results from selecting "Set V-out" from the "Operations" sub-menu which allows the user to program a constant output voltage.

If "Test Battery" is selected from the main menu, and "NiCd Set 4D" is selected on a sub-menu, the "Test NiCd Set 4D" menu screen 600 appears, as shown in FIG. 6D. Battery capacity is shown in percentage.

The test load module 38 is controlled by the micro processor 24 (or micro controller) to provide a preset load to a selected battery. The resultant battery voltage is monitored at V-out 33 and used to provide estimated capacity.

If "Operations" is selected from the main menu, and if constant voltage is selected from the operations sub-menu, screen 700 appears, as shown in FIG. 5E.

The output voltage set, Vset is shown on line 1 and may be changed on the fly by up/down arrows 702 on the keypad 216. The arrows 702 indicate to the user that this parameter may be adjusted. When Vset reaches 30V, only the down arrow is displayed. The dots 704 indicate that output is active (variable buck/boost converter 100 is on). Elapsed time indicator 706 is shown in hours:minutes and indicates time since operations began. "T" indicates temperature of ambient air or of some battery or device being powered depending upon how the sensor is connected. A "boost" operation is illustrated in screen 700.

By using the keypads 216, to select a Vset on screen 700, a user may program a constant output voltage to be in a range from about 2 VDC to 30 VDC. As mentioned above, input voltages are automatically accepted from about 3 VDC to about 30 VDC, or from about 100 VAC to about 240 VAC.

A constant current output from 0.05 to 2 ADC is also programmable. This is done by selecting "Operations" from the main menu 400, moving the cursor 402 and hitting the <enter> key, and selecting constant current from a sub-menu. The "Constant Current" operation differs from the "Recharge Operation" in that "Constant Current" just puts out selected current until a user stops the operation, whereas "Recharge Operation" has automatic charge termination based upon voltage, temperature and/or time.

In addition, a feature of the present embodiment includes programming a variable load at the DC output terminal 34 for diagnosing or manually discharging batteries. A variable load display shows a pre-set load programmed by the user. The variable load display allows monitoring output voltage while current flows into the pre-set load device 38 from the power output connector 34 coupled to the external battery or other power source for monitoring performance under variable load conditions. "Set load" is selected at the operations sub-menu which allows the user to set loads from 0.01 to 2A.

The functions in the operations sub-menu (Constant Voltage, Constant Current, Test Load) require the user to select desired output. "Recharge" and "Test Battery" are automated routines with algorithms tailored for the battery type selected.

Figure 7A:
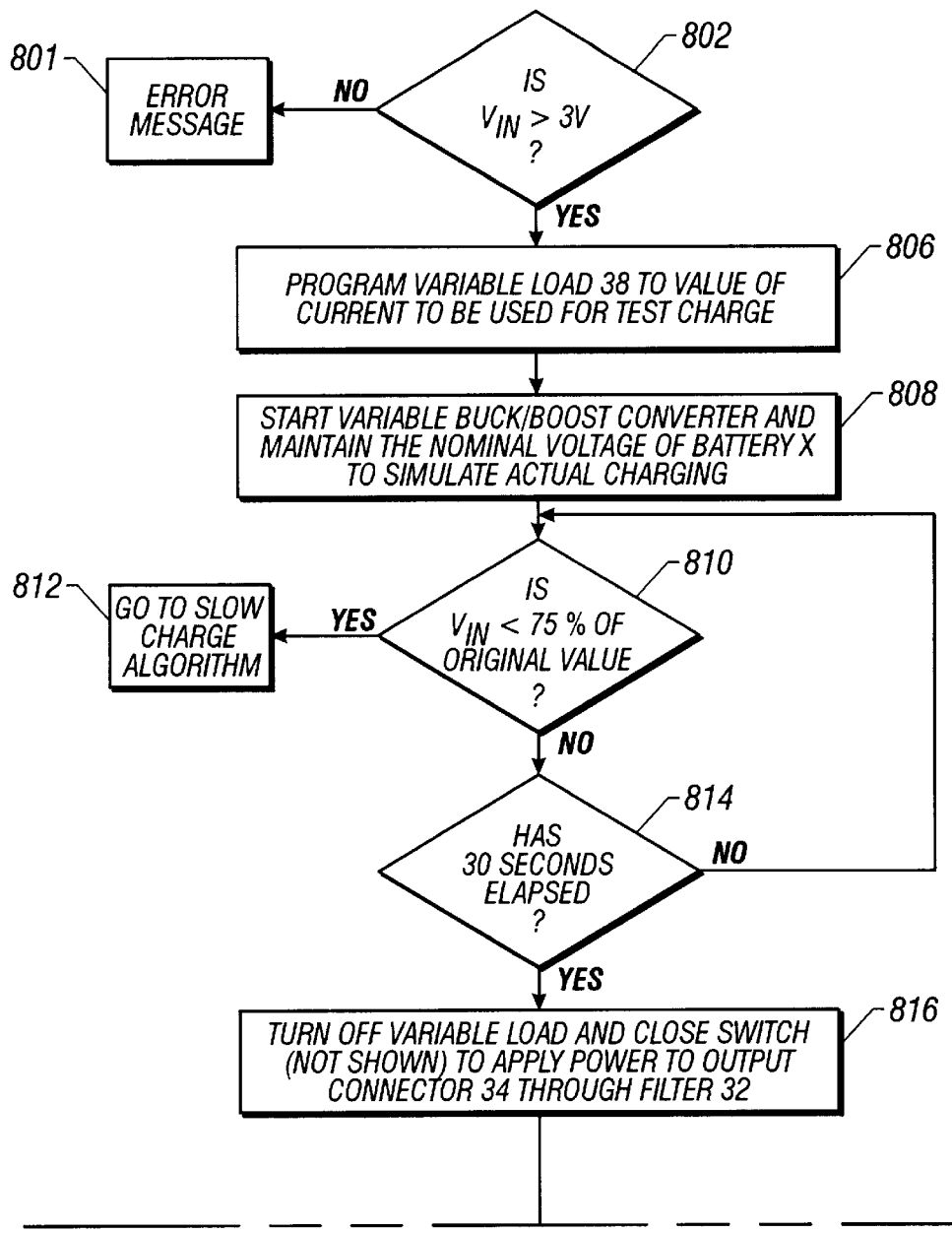
FIG. 7 is a flow chart of a NiCd Fast Charge Algorithm used in an automatic recharging function which may be called by a sub-menu from the "Recharge" screen display of FIG. 6C.
Figure 7B:
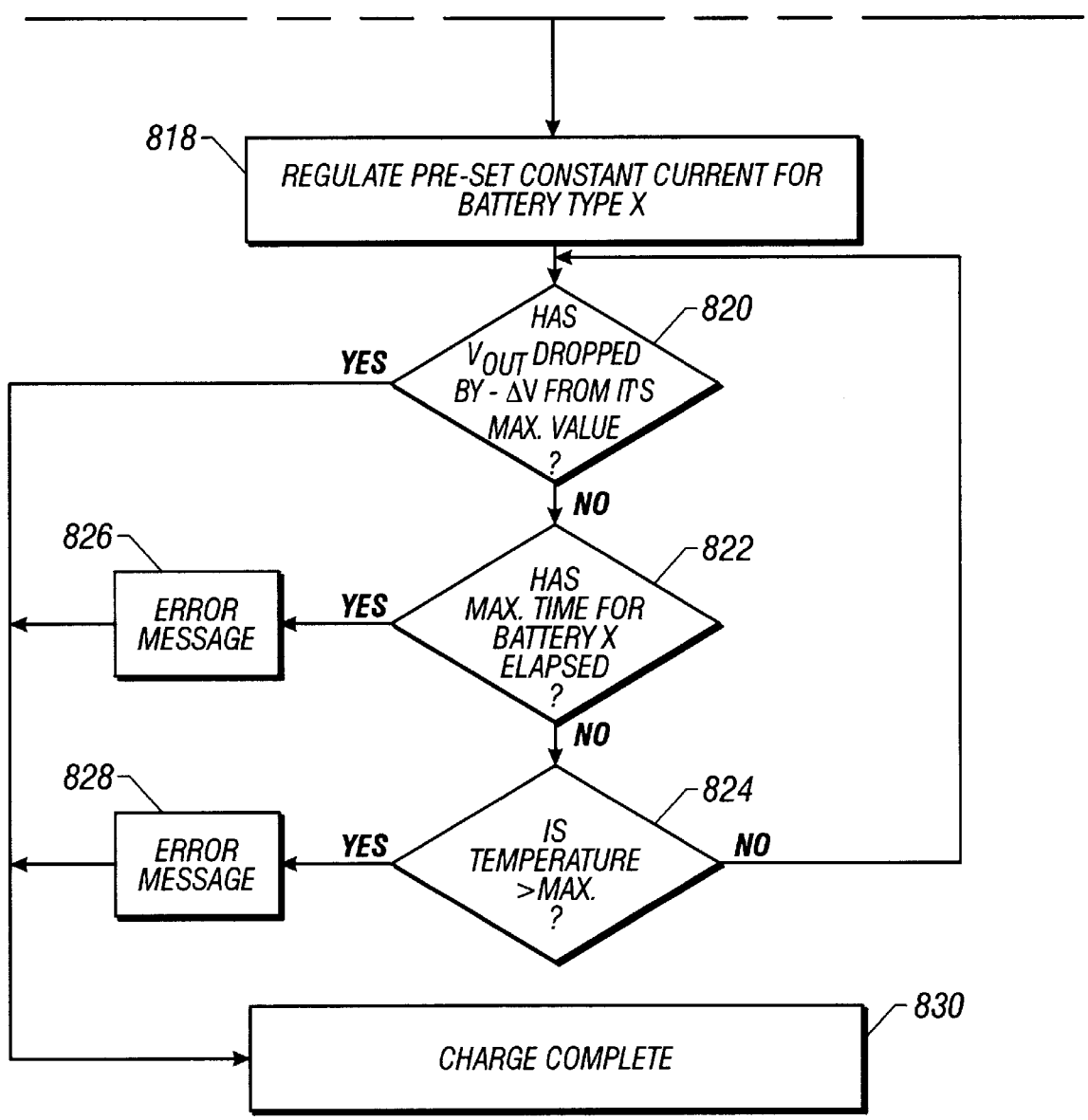

Referring to FIG. 7, a flow chart for a sample NiCd Fast Charge Algorithm is shown. Automated recharge routines such as shown by FIG. 7 are stored in UPM memory 26 for each battery supported and listed in the Recharge menu. Each battery chemistry will have it's own charging routine or algorithm. Some parameters will change within each routine depending on the particular battery selected.

For a NiCd battery a fast charge cycle consists of applying a constant current to battery terminals while monitoring battery voltage, temperature and elapsed time. The fast charge cycle normally terminates when the battery voltage dips by an amount referred to as negative delta V. For safety the fast charge cycle will also terminate if the battery temperature exceeds a maximum level or if the elapsed time is exceeded. The same routine is called in software for all NiCd batteries. Each particular NiCd battery will have a unique set of parameters such as constant current value, negative delta V ($-\Delta V$) and maximum elapsed time that will be used by the routine.

Additional automation provided by the UPM 10 involves testing the input power source 224, 228, 230, 232 before the charge is initiated to see if it is capable of maintaining a fast charge cycle which requires considerably more power than a slow charge. This is done by opening a switch (not shown) and disconnecting, for example, the specific battery 246 on the output connector. The variable load is then set to the value of the constant current used in the fast charge cycle. The Variable Buck/Boost Converter 100 is then turned on and set for an output voltage equal to that of the specific battery 246 to be charged. If the input voltage drops during this test by a given amount, typically 25%, then it is determined that the input source is not able to support a fast charge. In this case a slow charge is initiated which involves providing a smaller constant current than a fast charge. The normal termination method is when the elapsed timer reaches a preset time. Temperature is still used as a safety shutoff mechanism.

The fast charge algorithm is illustrated as a flow chart for an example battery type X. The algorithm of FIG. 7 starts by initiating a V-in Check 802. If V-in >3V a Program Variable Load step 806 is performed. Next a Start Converter step 808 simulates actual charging. A V-in Comparison step 810 determines if fast charging should proceed or if charging is to switch to slow charging by the Go to Slow Charge step 812.

Next, a 30 Second Check step 814 is performed, resulting in either performing another V-in comparison step 810 (if <305) or in an Apply Power step 816.

Next, a Regulate Current step 818 is performed. Next a V-out Check 820 is performed to compare V-out by the −ΔV computed from a maximum value. Next, a Charge Completion step 830 is performed to terminate charging, or a Maximum Time check 822 and Maximum Temperature check 824 is performed, resulting in error messages 826, 828 if time or temperature exceeds a maximum.

Automated battery testing requires the user to select a battery type from the UPM menu and attach a corresponding battery to the output connector. Once ENTER is pressed the UPM 10 tests the voltage on the output connector to be sure it is within a range indicative of the batter type selected. If it is not, an error message is displayed.

A preset load for the selected battery type is then programmed into the variable load 38 circuit. The load is maintained for a period of time, typically 10 seconds, while monitoring the battery voltage (V-out 33). A corresponding drop in battery voltage will be indicative of a state of charge of the battery.

A range of voltages from a minimum to a maximum, characteristic for the battery type selected, is broken up into five regions. If the voltage measured from the load test is below the minimum then 0% capacity is displayed. Otherwise the capacity displayed will be 20%, 40%, 60%, 80% or 100% depending on which region the measured voltage falls into. The boundaries for the five regions are determined from manufacturer discharge data and/or from lab testing.

Temperature

In one variation, an external temperature sensor 36 is placed in contact with a battery to be charged. The sensor 36 monitors the temperature of a battery as it is charged and its output is used to trigger a termination of the charging cycle in the event of an over temperature condition, thus avoiding damage to the battery and potentially dangerous conditions, such as explosions.

In one operation, ambient temperature, liquid temperature or surface temperature of other objects may also be measured with the external temperature sensor 36 and shown on a LCD 42, thus allowing the present embodiment to function as a thermometer, thereby increasing its field utility.

The input or output voltage measurement display 700 of the operations screens can also be used for non-precision voltmeter applications within the voltage range of the variable buck/boost converter 100.

Displays

During operation, as mentioned above, four analog signals are digitized. These four signals can then be displayed. They are "DC-in", "V-out", "I-out", and "temp", and represent, respectively, input voltage at the source (i.e., DC input or, when an AC source is used, the DC input generated by the external or internal converter), output voltage at the power output, output current sensed by the current sense circuit, and ambient/surface temperature detected by the temperature sensor. A timer in the microprocessor provides an elapsed time measurement for diagnostic use.

Software algorithms are incorporated in the microprocessor 24 to convert the microprocessor's crystal oscillator to an elapsed timer clock displaying hours and minutes as shown in display 500 for automated charge and discharge functions. The elapsed timer is also displayed in operations menus for Constant Voltage, Constant Current and Test Load. The elapsed timer assists a user to determine charge delivered when manually charging or discharging a battery. As described above, exemplary displays are shown in FIGS. 6B–E.

While the invention herein disclosed has been described by means of specific embodiments and applications thereof, numerous modifications and variations could be made thereto by those skilled in the art without departing from the scope of the invention set forth in the claims.

What is claimed is:

1. A power management system comprising:
   a first monolithic potentiometer, having at least 512 positions, the first monolithic potentiometer comprising at least one tap point, the at least one tap point including a tap control input, the at least one tap point being responsive to the tap control input;
   a second monolithic potentiometer coupled in series with the first monolithic potentiometer, and having at least 512 positions, the second monolithic potentiometer comprising at least another tap point, the at least another tap point including another tap control input, the at least another tap point being responsive to the other tap control input;
   means for switchably selecting a resultant tap point selected from the at least one tap point and the at least another tap point, and for applying a control signal to the tap control input or the other tap control input, respectively in accordance with the selected one of the at least one tap point and the at least another tap point, the resultant tap point and the control signal together determining an overall resistance of the first and second monolithic potentiometers;
   means coupled to the first and second monolithic potentiometers for maintaining a constant output voltage that is proportional to the overall resistance of the first and second monolithic potentiometers in response to varying input voltages.

2. The circuit of claim 1 further comprising a microprocessor coupled to the tap control input and the other tap control input and to the means for switchably selecting, for sending a tap control signal to one of the tap control input and the other tap control input and for sending a select signal to the means for selecting, the tap control input and the select signal varying as a function of a selected output voltage.

3. The circuit of claim 1 wherein an input voltage to the means for maintaining a constant output voltage is between 3 to 30 VDC.

4. The circuit of claim 1 wherein the constant output voltage is within 2 VDC to 30 VDC.

5. The circuit of claim 1 further comprising a microprocessor, coupled to the tap control input and the other tap control input, and to the means for switchably selecting, for sending a tap control signal to one of the tap control input and the other tap control input and for sending a select signal to the means for selecting, the tap control signal and the select signal varying as a function of one of a selected output voltage and a selected output current.

6. A variable buck/boost converter which provides a resistance chain comprising variable resistances for enabling an output selection from a set of constant output currents and constant output voltages, the converter comprising:
   a first monolithic digital potentiometer, having at least 512 positions and at least one tap point, the at least one tap point including a tap control input, the at least one tap point being responsive to the tap control input;
   a second monolithic digital potentiometer coupled in series with the first monolithic digital potentiometer, and having at least 512 positions and at least another tap point, the at least another tap point including another tap control input, the at least another tap point being responsive to the other tap control input;

means for switchably selecting a resultant tap point selected from the at least one tap point and the at least another tap point, and for applying a control signal to the tap control input or the other tap control input, respectively in accordance with the selected one of the at least one tap point and the at least another tap point, the resultant tap point and the control signal together determining overall resistance of the first and second monolithic digital potentiometers;

means coupled to the first and second monolithic potentiometers for maintaining a constant output voltage that is proportional to the overall resistance of the first and second monolithic digital potentiometers in response to varying input voltages.

7. A universal power manager providing output current control and output voltage control, comprising:

a variable buck/boost converter;

a microprocessor; and a current sense circuit;

wherein the variable buck/boost converter includes, a high-resolution digital potentiometer circuit providing a resistance chain, the resistance chain having a selectable range of resistances for enabling a range of output current and voltage levels and types, the high-resolution digital potentiometer circuit further comprising;

a first monolithic digital potentiometer, having at least 512 positions, the first monolithic potentiometer comprising at least one tap point, the at least one tap point including a tap control input, the at least one tap point being responsive to the tap control input, a second monolithic digital potentiometer coupled in series with the first monolithic potentiometer, and having at least 512 positions, the second monolithic potentiometer comprising at least another tap point, the at least another tap point including another tap control input, the at least another tap point being responsive to the other tap control input, and means for switchably selecting a resultant tap point selected from the at least one tap point and the at least another tap point, and for applying a control signal to the tap control input or the other tap control input, respectively, in accordance with the selected one of the at least one tap point and the at least another tap point, the resultant tap point and the control signal together determining overall resistance of the first and second monolithic digital potentiometers; and means coupled to the first and second monolithic potentiometers for maintaining a constant output voltage that is proportional to the overall resistance of the first and second monolithic digital potentiometers in response to varying input voltages;

wherein the microprocessor is coupled to the tap control input and the other tap control input and to the means for switchably selecting and is configured to send a tap control signal to one of the tap control input and the other tap control input and to send a select signal to the means for selecting, the tap control input based upon selected output voltage;

wherein the current sense circuit is coupled to the means for maintaining a constant output voltage and to the microprocessor and is configured to sense a current and to send a current indicator signal to the microprocessor, the microprocessor including means for maintaining a constant output current, in response to the current indicator signal, by grossly tuning the high-resolution potentiometer circuit in response to the current indicator signal.

8. The universal power manager of claim 7 further comprising an analog-to-digital converter coupled between the current sense circuit and the microprocessor.

9. The universal power manager of claim 8 said means for maintaining a constant output current comprising a computer program embedded in the microprocessor; and a keypad coupled to the microprocessor for entering data, the data comprising a desired constant current output from about 0.01 to 2 ADC.

10. The universal power manager of claim 9 further comprising a variable load module coupled to the microprocessor and to a power output of the means for maintaining a constant output voltage, wherein the variable load is used to diagnose a variable external power source at the power output.

11. The universal power manager of claim 10 further comprising a universal terminal adapter for enabling a connection between the universal power manager and a set of batteries and power devices, the adapter further comprising, a loop strap for wrapping around an external power device, the strap having a negative and positive slideably moveable tab, each having a metal contact for connection to a negative terminal and positive terminal of a battery, respectively, each tab connected to a connector by a wire.

12. The universal power manager of claim 11 further comprising, a first input power cable for connecting the universal power manager to a cable terminal of an adapter for termination of an external power source; and a second output power cable for connecting the power manager to an output device for powering.

13. A method for universal power conversion and universal battery charging, the method comprising the steps of:

selecting an output selection from one of a set of constant output voltages and constant output currents from a power charger/converter;

selecting, in response to the selecting of the output selection, one resultant tap point from each of a first and second monolithic potentiometers based upon tap control input data from a microprocessor;

switchably, further in response to the selecting of the output selection, selecting a resultant tap point from one of the first and second monolithic potentiometers based upon other control input from the microprocessor; and providing the output selection so that it is proportional to the overall resistance of the first and second monolithic potentiometers in response to varying inputs.

14. The method of claim 13 further comprising the step of:

sending output voltage data to the microprocessor;

adjusting the tap control input in response thereto; and performing fine tuning of an output voltage in response to the output voltage data.

15. The method of claim 14 wherein the adjusting of the tap control input includes maintaining a substantially constant output voltage.

16. A method for variable buck/boost power converting comprising the steps of:

receiving input power at a voltage regulator;

selecting an output parameter from one of a set of constant output voltages and constant output currents;

sending the selected output parameter to a microprocessor;

setting one tap point for each of a first and a second monolithic potentiometer based upon a tap control input from the microprocessor, the tap control input being selected as a function of the selected output parameter;

switchably selecting a resultant tap point from one of the first and second monolithic potentiometers based upon the tap control input;

sensing a current from a voltage regulator at a current sense circuit;

sending a current indicator signal from the current sense circuit to the microprocessor; and adjusting the tap control input, to perform current regulation.

17. The method of claim 16, wherein the adjusting of the tap control input includes switchably selecting and sending a signal, maintaining a substantially constant current control.

18. A programmable universal power manager enabling near-universal multi-operational power management, the power manager including:

an AC input means for accepting a near-universal AC input power coupled to an AC input connector engageable with an external AC power source;

a DC input means for accepting a near-universal DC input power coupled to a DC input connector engageable with an external DC power source; and a variable buck boost converter coupled to the AC input means, the DC input means and a power output connector, engageable with an external target device accepting power, the variable buck/boost converter including a resistance chain and configured to generate a selected near-universal output voltage proportional to an overall resistance of the resistance chain from the accepted near-universal input power;

a processor; and a current sense circuit, coupled to the variable buck boost converter and to the processor for sensing a current and sending a current indicator signal to the processor, the processor including means for maintaining a constant output current, in response to the current indicator signal, by tuning the resistance chain in response to the current indicator signal.

19. The universal power manager of claim 18 further comprising:

a battery test computer program unit to direct automated battery testing of a particular type of battery selected by a user, according to battery testing data in the processor and the battery selection; and a recharging computer program unit for directing automated recharging with charge-cutoff according to recharge data and the battery selection.

20. A programmable universal power manager with near-universal connectors and adaptors, enabling near-universal multi-operational power management, the power manager including:

an AC input means for accepting a near-universal AC input power comprising a Field Effect Transistor, the AC input means engageable with an external AC power source;

a DC input means for accepting a near-universal DC input power, comprising a Field Effect Transistor, the DC input means engageable with an external DC power source;

a variable buck boost converter coupled to the AC input means and the DC input means, for generating a selected near-universal output voltage from the accepted near-universal input power, the variable buck boost converter including an analog switch and a high-resolution resistance chain coupled to the analog switch;

a processor and memory coupled to the analog switch further including one or more of a group of computer program units including:

a battery test computer program unit to direct automated battery testing of a particular type of battery selected by a user, according to battery testing data and the battery selection; and a recharging computer program unit for directing automated recharging with charge-cutoff according to recharge data and the battery selection;

a keypad having a display, coupled to the processor, for sending one or more operating instructions to the processor for execution, the one or more operating instructions selected from a set of manual and automated instructions on a display, the set of instructions including:

a request for generating a user selected output voltage from a near-universal accepted input;

a request for generating a user selected constant output current from a near-universal accepted input;

a request for manually testing a load;

a request for automated battery recharging;

a request for automated battery testing;

a request for manual battery diagnostics;

a temperature sensor coupled to the buck/boost converter for monitoring a temperature of the target power device; and a plurality of connecting devices for coupling the power management device to a target device to be powered, the plurality of connecting devices engageable with the power management device and the target device to be powered.

21. The universal power manager of claim 20 wherein the display is a liquid crystal display and displays values for the output voltage, the output current, the accepted power input, and the temperature and time.

22. The universal power manager of claim 1 further comprising a hard, sealed encasing which seals the power manager from an external environment.

23. The universal power manager of claim 1 further comprising a microprocessor, coupled to the tap control input and the other tap control input, and to the means for switchably selecting, for sending a tap control signal to one of the tap control input and the other tap control input and for sending a select signal to the means for selecting, the tap control signal and the select signal varying as a function of one of a selected output voltage and a selected output current; and a personal computer, having a computer link coupled to the personal computer and to the universal power manager, that provides a data interface between the personal computer and the universal power manager, the personal computer further comprising one of a battery database and an external link to an external battery database.

24. The universal power manager of claim 23 further comprising a keypad having a display coupled to the microprocessor, the display displaying customized menus using the one of the battery database and the external battery database.

* * * * *